(No Model.)

F. CHALLONER.
GUIDING MECHANISM FOR RECIPROCATING CARRIAGES.

No. 540,719. Patented June 11, 1895.

Witnesses:

Inventor:
Frank Challoner,
By Winkler Flanders Smith Bottum & Vilas
Attorneys.

UNITED STATES PATENT OFFICE.

FRANK CHALLONER, OF OSHKOSH, WISCONSIN.

GUIDING MECHANISM FOR RECIPROCATING CARRIAGES.

SPECIFICATION forming part of Letters Patent No. 540,719, dated June 11, 1895.

Application filed October 17, 1890. Serial No. 368,430. (No model.)

*To all whom it may concern:*

Be it known that I, FRANK CHALLONER, of Oshkosh, in the county of Winnebago and State of Wisconsin, have invented certain new and useful Improvements in Guiding Mechanism for Reciprocating Carriages; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to avoid the friction of sliding bearings in reciprocating carriages.

It consists essentially of one or more parallel motions connecting the carriage with a suitable frame or support and arranged to guide the same in an approximately rectilinear path.

In the accompanying drawings, like letters designate the same parts in the several figures.

Figure 1:
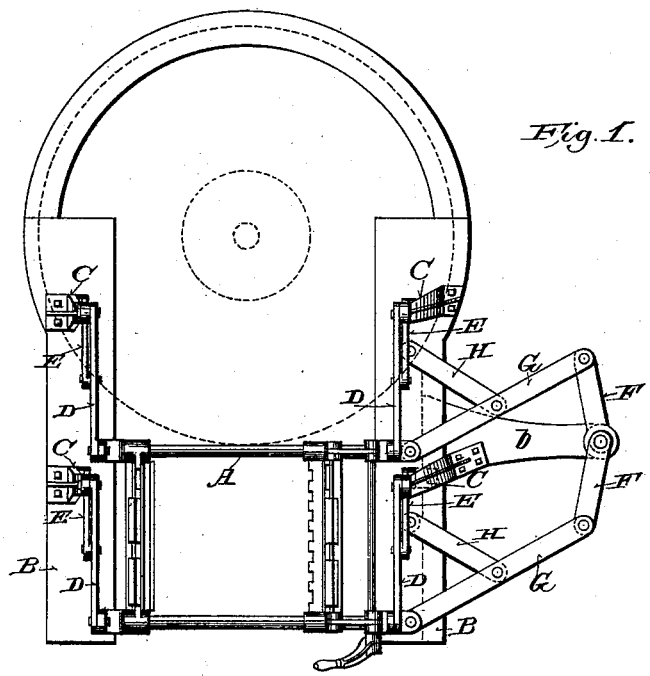
Figures 2, 3:
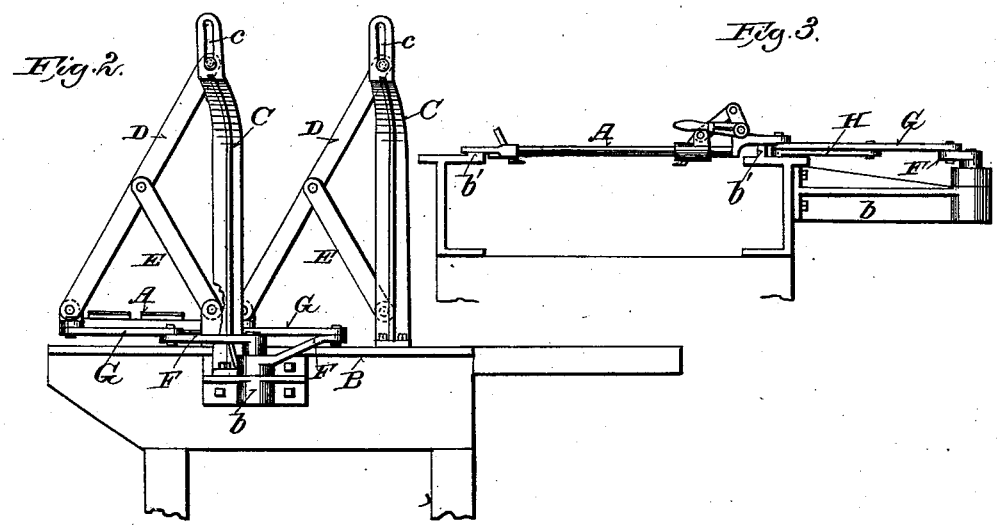

Figure 1 is a plan view of a shingle-sawing machine to which my improved carriage-guiding mechanism is applied. Fig. 2 is a side elevation of the same, and Fig. 3 is a front elevation showing the lateral without the vertical guiding mechanism.

Although I have shown my improvements in connection with a shingle-sawing machine, they are applicable to other machines employing reciprocating carriages.

A represents the carriage of a shingle sawing machine and B the frame of the machine.

C C are standards extending upwardly from the frame B at the sides of the machine and formed at their upper ends with vertical slots *c c*.

D D are parallel rods or bars pivoted to the sides of the carriage A at or near each end thereof and extending upwardly therefrom, and provided at their upper ends with pins which are inserted and loosely secured in the slots *c c* of standards C.

Parallel rods or bars E E of one-half the length of bars D D are pivoted at the ends to the middle of the bars D D and to the frame B of the machine. The arms or rods D and E constitute parallel motions by which the carriage is connected with the frame of the machine and is supported in a horizontal plane, and caused to move in a rectilinear path horizontally. The standards C C are so placed that when the rods D D are in a perpendicular position the carriage will be approximately midway between the limits of its movement.

To guide the carriage laterally in an approximately rectilinear path I provide similar guiding mechanism on one side to that by which it is supported.

*b* is an arm projecting horizontally from one side of the machine and provided at the outer end with a vertical sleeve in which are journaled concentrically the horizontally vibrating arms F F.

G G are parallel rods pivoted to the ends of the vibrating arms F F and to the adjacent side of the carriage A, and H H are parallel rods of one-half the length of rods G, pivoted at their ends to the middle of rods G and to the frame B. By these connections the carriage is guided laterally in an approximately rectilinear path. The slight deviation therefrom due to the arc motion of the arms F F may be disregarded, a slight endwise movement of the carriage in its travel being no detriment to the operation of the machine.

The lateral guiding mechanism may be employed without the supporting parallel motions first described, suitable supporting ways *b' b'* being provided in this case for the carriage, as shown in Fig. 3.

By the employment of the mechanism last described by itself the friction produced by the end thrust of the carriage on the sliding guideways is avoided. When both the supporting and guiding mechanism herein described, is employed, the friction of sliding bearings is altogether avoided.

The devices are susceptible of various modifications to adapt them to different machines and purposes, without affecting their mode of operation or departing from the spirit of my invention.

I claim—

1. The combination with a reciprocating carriage, of guiding mechanism, consisting of parallel motions connecting the opposite sides of the carriage with a suitable frame or support and arranged to guide it in an approximately rectilinear path, the carriage lying between said parallel motions to travel in the space between them, substantially as and for the purposes set forth.

2. The combination with a reciprocating carriage, of guiding mechanism, consisting of parallel motions connecting the opposite sides of the carriage with a suitable frame or support and arranged to guide it in an approximately rectilinear path, the carriage lying between said parallel motions to travel in the space between them, and lateral guiding mechanism, substantially as and for the purposes set forth.

3. The combination with a reciprocating carriage and suitable frame, of lateral guiding mechanism, consisting of two horizontally vibrating arms, parallel rods pivotally connecting the adjacent side of the carriage with said arms, and shorter parallel arms pivotally connecting the aforesaid arms at an intermediate point with said frame, substantially as and for the purposes set forth.

4. The combination with a reciprocating carriage and suitable frame, of supporting and guiding mechanism, embracing horizontal parallel rods pivotally connecting one side of the carriage with the frame, shorter parallel rods pivotally connecting the aforesaid rods with said frame, upright parallel rods pivoted to the sides of the carriage at their lower ends and having vertically adjustable connections with said frame at their upper ends and shorter upright rods pivoted at their upper ends to the aforesaid upright rods at intermediate points thereof and pivoted at their lower ends to said frame, substantially as and for the purposes set forth.

In testimony that I claim the foregoing as my own I affix my signature in presence of two witnesses.

FRANK CHALLONER.

Witnesses:
O. WORM,
O. W. BARKMAN.